United States Patent
Eick et al.

(10) Patent No.: US 9,726,769 B2
(45) Date of Patent: Aug. 8, 2017

(54) METHOD FOR SEPARATING SEISMIC SOURCE DATA

(71) Applicant: CONOCOPHILLIPS COMPANY, Houston, TX (US)

(72) Inventors: Peter M. Eick, Houston, TX (US); Joel Brewer, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 253 days.

(21) Appl. No.: 14/667,856

(22) Filed: Mar. 25, 2015

(65) Prior Publication Data
US 2015/0285928 A1  Oct. 8, 2015

Related U.S. Application Data

(60) Provisional application No. 61/975,376, filed on Apr. 4, 2014.

(51) Int. Cl.
| | |
|---|---|
| *G01V 1/00* | (2006.01) |
| *G01V 1/30* | (2006.01) |
| *G01V 1/36* | (2006.01) |
| *G01V 1/37* | (2006.01) |
| *G01V 1/145* | (2006.01) |
| *G01V 1/047* | (2006.01) |

(52) U.S. Cl.
CPC .............. *G01V 1/005* (2013.01); *G01V 1/30* (2013.01); *G01V 1/36* (2013.01); *G01V 1/375* (2013.01); *G01V 1/0475* (2013.01); *G01V 1/145* (2013.01); *G01V 2210/1212* (2013.01); *G01V 2210/1295* (2013.01); *G01V 2210/1425* (2013.01); *G01V 2210/61* (2013.01)

(58) Field of Classification Search
CPC ...... G01V 1/005; G01V 1/145; G01V 1/0474; G10K 11/18
USPC ................... 181/111; 367/41, 189
See application file for complete search history.

(56) References Cited

U.S. PATENT DOCUMENTS

| | | | |
|---|---|---|---|
| 4,168,485 A | * | 9/1979 | Payton ............. G01V 1/37 367/189 |
| 4,750,157 A | | 6/1988 | Shei |
| 4,899,321 A | | 2/1990 | Solanki |
| 4,982,374 A | * | 1/1991 | Edington ............. G01V 1/04 367/41 |
| 5,550,786 A | | 8/1996 | Allen |
| 5,703,833 A | | 12/1997 | Allen |

(Continued)

FOREIGN PATENT DOCUMENTS

WO     2005019865     6/2006

OTHER PUBLICATIONS

International Search Report for parent case, App. No. PCT/US15/022412, Issued Jul. 6, 2015.

(Continued)

*Primary Examiner* — Ian J Lobo
(74) *Attorney, Agent, or Firm* — ConocoPhillips Company

(57) ABSTRACT

Imperfect separation at the higher frequencies has been observed and was eventually was tracked down to the poor GFE signal that is normally used in the inversion. The invention thus uses a "derived GFE" for each source, obtained by comparing the shot records and remove the differences, instead of the prior estimated GFE signal put out by the controller, thus accurately maximizing the separation of the data.

18 Claims, 4 Drawing Sheets

(56) References Cited

U.S. PATENT DOCUMENTS

| | | | |
|---|---|---|---|
| 5,715,213 | A | 2/1998 | Allen |
| 5,719,821 | A | 2/1998 | Sallas |
| 5,721,710 | A | 2/1998 | Sallas et al. |
| 5,790,473 | A | 8/1998 | Allen |
| 5,850,622 | A | 12/1998 | Vassiliou et al. |
| 6,161,076 | A | 12/2000 | Barr et al. |
| 6,766,256 | B2 | 7/2004 | Jeffryes |
| 7,333,393 | B2 | 2/2008 | Vossen et al. |
| 7,436,734 | B2 | 10/2008 | Krohn |
| 7,508,733 | B2 | 3/2009 | Haldorsen |
| 8,371,416 | B2 | 2/2013 | Eick |
| 2002/0181328 | A1* | 12/2002 | de Kok ............ G01V 1/005 367/73 |
| 2009/0010103 | A1 | 1/2009 | Sallas |
| 2011/0013482 | A1 | 1/2011 | Eick |
| 2011/0305113 | A1 | 12/2011 | Eick |
| 2012/0033529 | A1 | 2/2012 | Eick |

OTHER PUBLICATIONS

J. J. Sallas, Seismic Vibrator Control and the Downgoing P-Wave, Geophysics 49(6) 732-40 (1984).

SEG-2009-001: Shaw S. A., et al., Vibroseis Source Signature Uncertainty and Its Impact on Simultaneous Sourcing (2009).

Shan S., et al., Load Cell System Test Experience: Measuring the Vibrator Ground Force on Land Seismic Acquisition, SEG Expanded Abstracts, 0016-0020 (Oct. 2009).

Seismic Source Company, "Quality Seismic Acquisition Products" Brochure (2008).

Van der Veen, et al. "Weighted sum method for calculating ground force: an evaluation by using a portable vibrator system" Geophysical Prospecting (2009), vol. 47, pp. 251-267.

Mewhort et al, "Does it matter what kind of vibroseis deconvolution is used?" Brochure 2002.

\* cited by examiner

METHOD FOR SEPARATING SEISMIC SOURCE DATA

CROSS REFERENCE TO RELATED APPLICATIONS

This application claims benefit of U.S. Patent Application Ser. No. 61/975,376 filed Apr. 4, 2014, entitled "METHOD FOR SEPARATING SEISMIC SOURCE DATA," which is hereby incorporated by reference.

FEDERALLY SPONSORED RESEARCH STATEMENT

Not applicable.

FIELD OF THE DISCLOSURE

The disclosure generally relates to a method for obtaining more accurate seismic survey data, and more particularly to a method of utilizing the Ground Force Estimate (GFE) as the preliminary input to iterative inversion along with the setup field data so as to more accurately separate signals from different vibes and to minimize the cross-talk or leakage of the other vibes source signature onto the separated source records.

BACKGROUND OF THE DISCLOSURE

Seismic surveys image or map the subsurface of the earth by imparting acoustic energy into the ground and recording the reflected energy or "echoes" that return from the rock layers below. The source of the acoustic energy can be generated by explosions, air guns, vibrators, and the like. The energy source is positioned on or near the surface of the earth. Each time the energy source is activated, it generates a seismic signal that travels into the earth, is partially reflected, and, upon its return, may be detected at many locations on the surface as a function of travel time. The returning seismic energy is recorded as a continuous signal representing displacement, velocity, acceleration, or other recorded variation as a function of time. Multiple combinations of energy source and sensor can be subsequently combined to create a near continuous image of the subsurface that lies beneath the survey area. One or more sets of seismic signals may be assembled in the final seismic survey.

Technology continues to increase the resolution and complexity of seismic systems, such as high fidelity vibroseis systems. Vibroseis is a method used to propagate energy or a signal into the earth over an extended period of time as opposed to the near instantaneous energy provided by impulsive sources. The data recorded in this way must be correlated or inverted to convert the extended source signal into an impulse using the pilot sweep for the vibroseis method. In the case of ZenSeis® or HFVS, inversion is used with the measured ground motions of the vibrator or the best available proxy for that signal. The source signal using this method was originally generated by a servo-controlled hydraulic vibrator or shaker unit mounted on a mobile base unit, but electro-mechanical versions have also been developed.

A modern seismic vibrator typically comprises a hydro-mechanical or electromechanical system driven by a servo valve assembly that is electronically controlled through feedback loops. A baseplate is connected to a hydraulic or electromechanical system that raises and drops the baseplate to deliver a force into the ground. Since the actual force applied to the ground is known to differ from the pilot sweep, these techniques typically use the Ground Force Estimate put out by the controller as a proxy for the source wavelet.

Ideally, a vibrator used in vibroseis data acquisition should produce ground force as a known spatially-invariant wavelet such that any variations in refection data can be attributed to variations in geology, but due to the baseplate flexure and limitations of accelerometer placement on the baseplate, among other issues, the true ground force is not the same as the ground force estimate (GFE) used as the reference in calculating the cross-correlation function with the far-field data.

Actual field testing of conventional vibrators has shown that the ground force estimate (GFE) provided by the vibe electronics is wrong. In particular, it fails in terms of phase and frequency fidelity above about 50 Hz depending on the model of the vibrator. This appears to be due to poor assumptions built into the vibe controller and the ground coupling issues, hydraulic limits and baseplate flexure. The GFE is used in the separation step of ZenSeis® and other vibroseis systems to properly separate out the sources, such that any error in the GFE shows up as imperfect separation between the simultaneously acquired source records.

Conventional efforts to increase the recordable high frequency energy have been primarily focused on providing longer sweeps or lengthening the proportion of the sweep time for which the higher frequency energy is delivered into the ground. As a sweep-type vibrator delivers the seismic energy into the ground, it records each sweep and computes an approximate ground force delivered into the ground for use by a feedback circuit to control the vibe for the next sweep. This ground force approximation is used in subsequent analysis in seismic data processing.

Conventional vibrator technology uses a weighted-sum method to approximate the "ground force" during a sweep. In 1984, Sallas derived the weighted-sum method to approximate the true ground force (Sallas, 1984). The weighted-sum method assumes that a baseplate acts as a rigid body, and that a full coupling between the baseplate and the ground is achieved. Under these assumptions, the weighted-sum ground force is obtained by summing the weighted baseplate and reaction mass accelerations. The Sallas approximation or equation may be written as:

$$-F_g = M_r A_r + M_b A_b,$$

where $M_r$=Mass of the reaction mass (kg); $M_b$=Mass of the baseplate (kg); $A_r$=Reaction mass acceleration (m/s); $A_b$=Baseplate acceleration (m/s); and $F_g$=Compressive force exerted on the earth by the baseplate (N). This is normally reported as the ground force of the vibrator.

The dynamics of vibrator system seems to inherently limit the power that is deliverable into the ground at high frequency. A low frequency is delivered by a longer, slower stroke of the reaction mass while a higher frequency stroke is fast and typically shorter in length.

While the Sallas approximation indicates that a fast stroke of shorter length provides equal force to the ground, the absence of the higher frequency data in the data traces or records from the field could mean that either the true force is not what is approximated by the Sallas equation or that consistent force across a broad frequency spectrum does not deliver consistent energy delivery across a broad frequency spectrum.

Different attempts have been made to increase the recorded bandwidth and for better source separation. For example, WO2005019865 describe a method for improving the efficiency of acquiring vibratory data with a method in which data from a number of vibrators shaking simultaneously in seismic proximity to one another are separated by using a number of phase encoded sweeps, where the number of sweeps is greater than or equal to the number of vibrators, resulting in a set of linear equations that can be solved simultaneously. However, the method does not exclude inherent errors resulted from poor GFE estimates.

U.S. Pat. No. 8,371,416 provides a method of obtaining True Ground Force by installing load sensors to the baseplate, so that the actual output can be measured as the basis for inversion. However, this represents significant capital cost to improve the existing equipment, and the durability of the load sensors may pose further problems. Also, the installation of load sensors further limits area available for imparting vibratory forces into the ground.

Therefore, there is the need for an efficient and reliable method of separating sources without the need to add on further equipment to existing system.

SUMMARY OF THE DISCLOSURE

The invention addresses the problem of imperfect separation by using the total dataset from any grouping of vibes and receivers that was collected. This dataset from a grouping of sources and receivers is normally called a "setup". The field data from the receivers and the GFE data from the sources are then fed into the inversion program for separation and summation. Performing iterative inversion with optimization parameters (e.g., derived GFE) enables us to minimize the cross-talk without requiring re-engineering the vibes. The derived GFE can then be used to separate the multiple source records. The optimization parameters are intended to minimize the cross-talk or leakage of other vibratory source signature onto the separated source records.

In more detail, this method is accomplished by the following:

The first step is to invert the setup and for an illustrative example we will use 3 vibes arranged in a 2D line with a plurality of receivers on the line.

Secondly, after separation there will be 3 different shot records corresponding to the 3 different vibe or source locations. At each of the 3 shot records, the receiver data located at the 2 other vibe sources will be compared and the datasets differenced. The differences are the residual cross-talk due to imperfect separation.

In the third step, this data along with the full setup will be sent to an optimization program that will minimize the residual cross talk at each source location by modifying the GFE for each vibe. Once the GFE's are optimized to some minimal cross talk criteria, the GFE's will be called the "derived GFE's."

In the final step, the remaining setup(s) worth of data will be started through the process, but using the "derived GFE" instead of the initial GFE, thus providing cleaner and more accurate data.

As used herein, "energy sources" or "vibratory source" or "source" includes ZENSEIS™, vibroseis, seismic vibrators, airguns, plasma shots, dynamite, and other sources known to one of ordinary skill in the art.

Seismic vibrators include trucks, tractors, trailers, boats or ships, submarines, subterranean, or other sources that have a base plate that can be brought into contact with the earth or water. A reaction mass is vibrated at varying frequencies against the baseplate to produce vibratory motion (transmit vibration energy) which travels downward into the earth via the base plate.

A survey may be designed that uses multiple energy sources, each being activated simultaneously so that the recording instruments capture a composite signal with contributions from multiple vibrators. The composite signal forms a record that may be either intentionally composite or separable through data inversion. A variety of programs are available to generate differing source patterns controlled in space, time, and frequency.

In vibroseis the seismic energy source is distributed over a period of time. This distribution of energy over time creates a distinct signal, such as a sweep, in which the signal changes systematically from normally a low frequency at the beginning to high frequency at the end of the source although other sweep techniques may be used. Dependent upon the desired signal, the number of vibroseis units being conducted simultaneously, and transmission properties of the ground, different seismic sweeps may be developed. Computer processing of the seismic signals uses the distinct characteristics of the sweep to "collapse" the energy into short duration wavelets. ZENSEIS® sources include vibroseis, seismic vibrator, and combinations thereof. Other multiple source seismic surveys include high fidelity vibratory seismic (HFVS), cascaded HFVS, combined HFVS, slipsweep, and the like.

"Simultaneous" or "concurrent" sweeps are conducted by two or more seismic sources during overlapping periods of time. In contrast, synchronous sweeps are conducted by two or more seismic sources started and stopped at the same time. Using a starting pulse signal, computer control, or other coordinated methods, synchronized vibrators on a seismic survey may be started within milliseconds to generate a synchronous seismic signal. During synchronous seismic surveys the source vibrator frequency, phase, amplitude, and the like, may be synchronized to reduce interference, enhance signal, or otherwise enhance or modify the recorded data. Using a "simultaneous" sweep the source signals may have a "lag" either by design or unintentionally. In one embodiment, source signals are intentionally designed with a lag from 1 ms to 20 seconds wherein the lag allows independent signal encoding. The length of the lag can be up to the length of the sweep and listen time combined. In another embodiment, seismic sources are given one or more positions and time windows, but are operated independently. When the seismic sources are operated independently an arbitrary lag is created due to the asynchronous (or random) operation of the sources.

"Receivers" suitable for use herein include geophones, hydrophones, accelerometers, electrodynamic receivers, and the like. Receivers may receive one or more than one type of data including vibrational and acceleration data. Vibrational data may be measured between about 1 Hz to 2 KHz, including data from 6 to 80 Hz, about 20 to 40 Hz, or simply all data less than 160 Hz, and combinations thereof Receivers may typically include a "recorder" or have the ability to transmit data to a remote recorder. A recorder includes receiver/recorder combinations that automatically record data from the receiver including systems that record data at the receiver and those that record data at a remote location. In a preferred embodiment, data is stored in a temporary drive at the receiver until it is transferred either physically or wirelessly to a central recorder for data analysis.

"Source point recorder" is one or more recorders positioned on or at the energy source identical to recorders positioned farther from the source ("field recorders"). The source point recorder is typically located on or at the base of the energy source, adjacent to the energy source, or very near the energy source as long as, in the system being used, the source point recorder is statistically and electronically similar to recorders located at the origin of the source. In some systems, the source point recorder may be located up to 10 meters from the energy source and still record data statistically identical to that at the energy source. In other systems, where multiple sources are used, the source point recorder may be located at one of many energy sources, may be located between multiple energy sources, and/or multiple source point recorders may be located at one or more energy sources.

Seismic recording systems are disclosed with two or more seismic energy sources and one or more data recorders, operated asynchronously by recording energy source signatures and synchronizing the recorded data through inversion with the energy source signatures.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| GFE | Ground Force Estimate |

DETAILED DESCRIPTION

Figure 1:
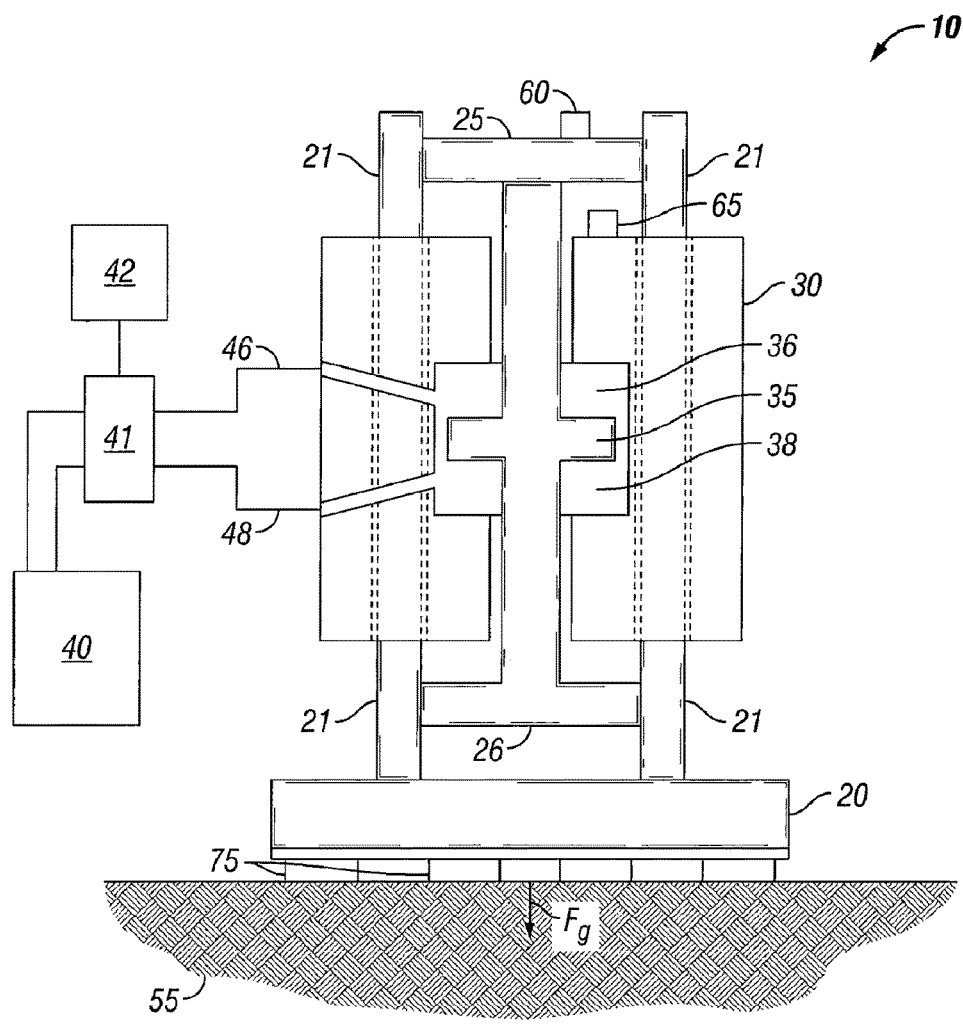
FIG. 1 is a cross-sectional view of a conventional seismic vibrator on an array of load sensors.

The disclosure provides novel method of achieving better separation of source data by using setup field data and GFE unique to each vibratory source as the preliminary input, and adjusting the inversion to minimize the crosstalk and/or leakage from other vibratory sources.

The invention includes one or more of the following embodiments, in any combinations thereof:

A method of separating seismic sources is provided, which comprises the steps of: (a) providing at least two vibratory sources and two or more receivers, wherein said vibratory sources are each capable of generating a sweep of vibrations into the ground; (b) performing a sweep of vibrations into the ground by said vibratory sources and concurrently recording a setup field data from each of said vibratory sources using each of said receivers, wherein an initial Ground Force Estimate (GFE) specific to each of said vibratory sources is obtained; (c) performing iterative inversion for the setup field data from each of said vibratory sources using said initial GFE as preliminary input to obtain inverted setup field data; (d) separating said inverted setup field data to obtain a shot record for each of said receivers from each of said vibratory sources, wherein for each said vibratory source the number of said shot records is the same as the number of said receivers; (e) comparing and differentiating said shot records of the same vibratory source to yield a crosstalk modifier; (f) modifying the initial GFEs using said crosstalk modifier to obtain a derived GFE; and (g) repeating the data collection and analysis using the derived GFE data to minimize cross talk from the shot records of said vibratory sources.

An improved method for separating seismic sources is provided, where at least two vibratory sources and two or more receivers are provided and said vibratory sources are each capable of generating a sweep of vibrations into the ground, and a sweep of vibrations is emitted into the ground by said vibratory sources and concurrently a setup field data from each of said vibratory sources is recorded using each of said receivers, wherein an initial Ground Force Estimate (GFE) specific to each of said vibratory sources is obtained, the improvement comprising: (a) performing iterative inversion for the setup field data from each of said vibratory sources using said initial GFE as preliminary input to obtain inverted setup field data; (b) separating said inverted setup field data to obtain a shot record for each of said receivers from each of said vibratory sources, wherein for each said vibratory source the number of said shot records is the same as the number of said receivers; (c) comparing and differencing said shot records of the same vibratory source to yield a crosstalk modifier; and (d) modifying the initial GFEs using said crosstalk modifier to obtain a derived GFE, and (e) using the derived GFE in analyzing the remaining data.

An improved method for separating seismic field result where at least two vibratory sources and two or more receivers are provided and said vibratory sources are each capable of generating a sweep of vibrations into the ground, and a sweep of vibrations is emitted into the ground by said vibratory sources and concurrently a setup field data from each of said vibratory sources is recorded using each of said receivers, wherein a initial Ground Force Estimate (GFE) specific to each of said vibratory sources is obtained, the improvement comprising comparing and differentiating said shot records of the same vibratory source to yield a crosstalk modifier; modifying the initial GFE using said crosstalk modifier to obtain a derived GFE; and analyzing all remaining field data using said derived GFE in place of said initial GFE to obtain a final seismic record.

A method of wherein said initial GFE is obtained from a baseplate and reaction masses of said vibratory sources.

A method wherein said crosstalk modifier is subtracted from said initial GFE to obtain said derived GFE.

A method wherein said sweep of vibration is between 0 to 200 Hz.

A method wherein said vibratory sources are selected from the group consisting of a ZENSEIS®, vibroseis, seismic vibrator, high fidelity vibratory seismic (HFVS), cascaded HFVS, combined HFVS, and combinations thereof A method wherein said receivers are selected from group consisting of a geophone, hydrophone, accelerometer, electrodynamic receiver, and combinations thereof A method wherein each said vibratory source emit a distinct seismic energy source signature.

A method wherein said receivers are aligned in a receiving line, and at least one of said vibratory sources is not in said receiving line.

Figure 2:
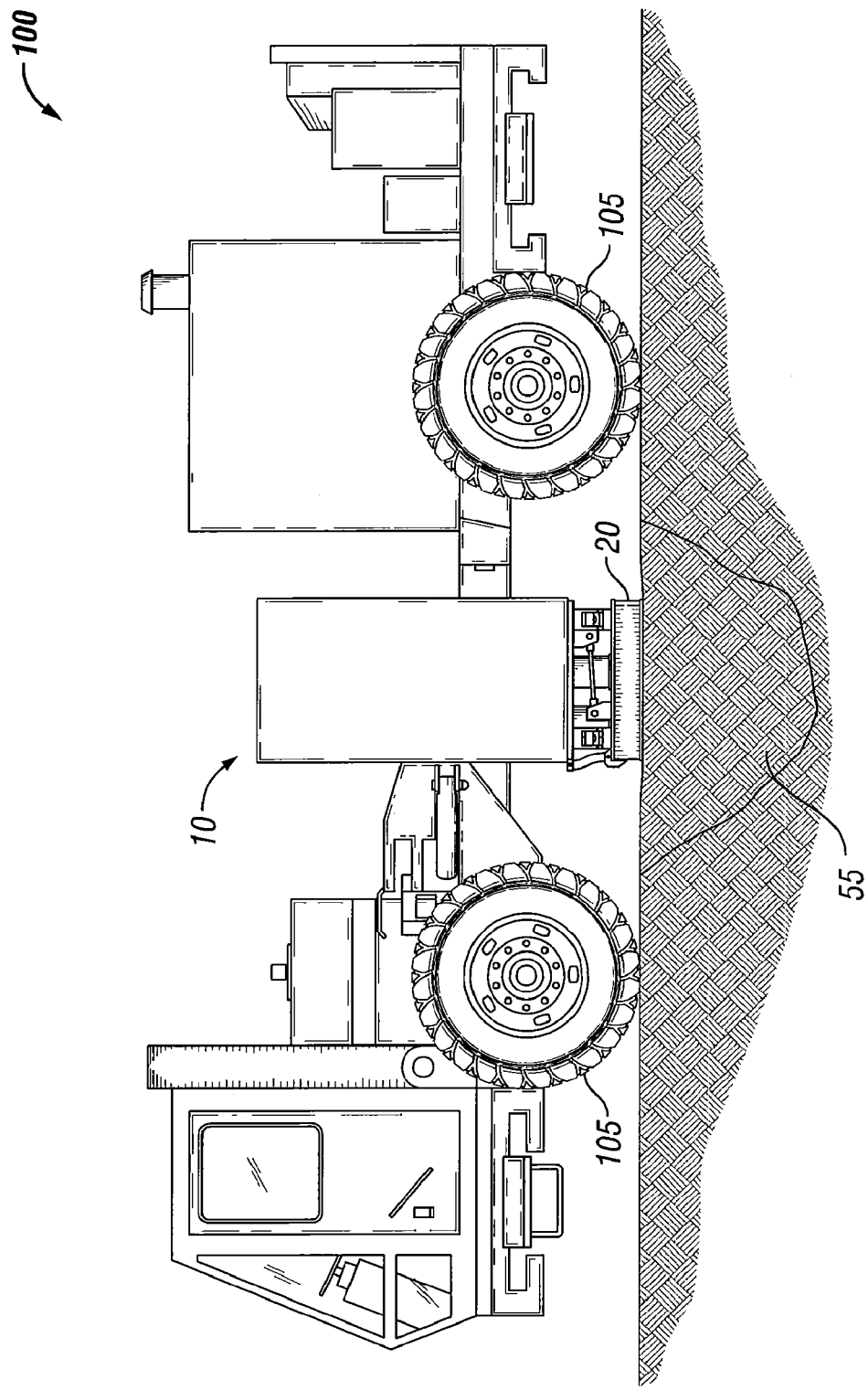
FIG. 2 is a diagram of a conventional seismic vibrator vehicle.
Figure 3:
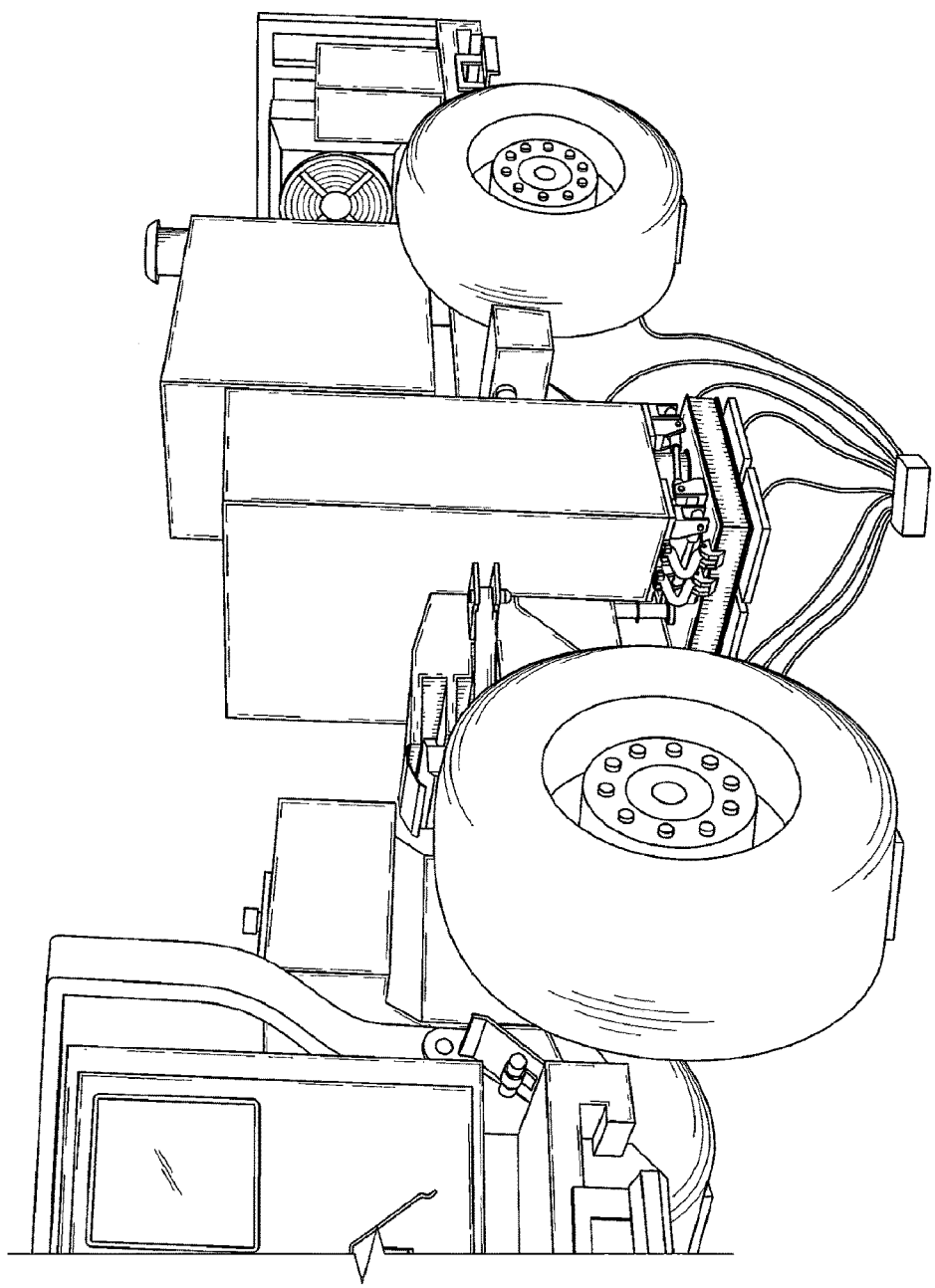
FIG. 3 is an image of a conventional vibrator with the weight of the vehicle wheels biased onto the baseplate for delivering a sweep of seismic energy into the ground.

To better understand this invention, it is important to illustrate the typical way of conducting seismic survey and how the data is recorded. FIG. 1-3 show a conventional seismic sweep operation. As noted above, it has been difficult to acquire suitable high frequency data when using sweep-type vibratory seismic sources and investigations pursuant to the present invention have turned toward a better approach to separate the data from different sources in hopes of increasing the presence of high frequency data in the returning wavefield.

The analysis begins with a seismic vibrator that one might typically use in a seismic survey. For explaining the invention, a conventional sweep-type vibratory seismic source is illustrated in FIG. 1 and is now explained.

A simplified version of the operable portion of a conventional seismic vibrator is generally indicated by the arrow 10. The primary operative element is baseplate 20 that is lowered to the ground 55 and held down typically using the weight of the vehicle that carries vibrator 10. Typically, vibrator 10 is carried along under the belly of the vehicle and lowered to the ground once located at a shot point or source point. While the weight of the vehicle is used to hold the baseplate to the ground, it is typically isolated from the intense vibration by pneumatic dampeners that are not shown. The second operative element of the vibrator is reaction mass 30 that is positioned to slide up and down along guide rods 21. The reaction mass 30 is a heavy and substantial sized block of metal. The reaction mass 30 is intended to be moved up and down to create impulses that are passed into the ground 55 through baseplate 20.

The reaction mass 30 is driven up and down along guide rods 21 by a hydraulic system, schematically indicated by box 40, where hydraulic fluid is delivered through a valving system 41 and into and through channels 46 and 48. Upper and lower cylinders 36 and 38 are rapidly filled and drained of hydraulic fluid to drive the reaction mass 30 relative to piston 35. Vibe controller 42 controls the valving system 41, thereby controlling the speed and direction of the reaction mass and ultimately the frequency and force at which the reaction mass moves. The hydraulic system 40 typically includes a diesel powered hydraulic pump. As noted above, this is the basic arrangement of a conventional sweep-type vibrator. A baseplate accelerometer 60 measures the acceleration of the baseplate 20 while a reaction mass accelerometer 65 is mounted on the reaction mass 30 to record the acceleration of the reaction mass 30.

Continuing with the discussion of the analysis of the seismic source, the vibrator 10 is operated to generate seismic energy by using one or more load sensors between the baseplate 20 and the ground. As shown in FIG. 1, an array of load sensors 75 can optionally be placed under the baseplate 20 to more accurately measure the true ground force produced at each frequency to determine the actual ground force ($F_g$) applied to the earth over a range of frequencies. Load sensors 75 are not needed, however, with the method of the invention, as explained next.

Although it is known that vibes provide a ground source estimate that is used for inversion and subsequent data processing, it turns out that current vibrators do not provide accurate information about the ground force actually delivered to the ground. The load sensors provide more accurate data and this has been confirmed by experiments using seismic receivers installed in boreholes deep in the ground, however, they take up space and contribute to costs.

It should be emphasized that experiments have confirmed two important observations. First, the vibrators do not actually impart the ground force to the earth they report based on the ground force data computed by the vibrator controller based on the Sallas estimation, especially at higher frequencies. And secondly, the load sensors provide a relatively accurate ground force measurements across the frequency spectrum.

The information provided by the vibrator controller is sufficiently accurate at lower frequencies, but inaccuracy begins at about 35 Hz (depending on the vibrator model and ground conditions) and continues to deviate as the frequency being delivered gets higher. The inaccuracy becomes unacceptable under most conventional ground conditions at frequencies of about 40 to 50 Hz in the sweep for most terrains using industry standard 60,000+ lbs vibrators. Specifically, most large industry standard seismic vibrators begin to reduce the actual ground force at about 35 Hz (as compared to what the vibrator actually reports via the vibe controller and the Sallas approximation), and the ground force is quite variable above about 40 to 50 Hz. Much above 60 Hz and the forces in the sweeps are highly unstable and do not reflect the signal that is desired to be imparted to the ground and as reported by either the load cell data nor the data from the receivers in the well bore.

The seismic vibrator controller electronics 42 is supplied a pilot sweep that represents the desired source signature. The pilot sweep is a sinusoidal function that varies in frequency with time. It is used by the valving system 41 as a representation for the desired motion of the baseplate 20 and reaction mass 30. The motion of the baseplate 20 is then translated into ground force through impulses with the earth. Ground force is actually weight that varies in time in a similar manner to the way the pilot sweep's sinusoidal shape varies in time. The ground force measured by the array of load sensors and the pilot sweep are then directly related and are also directly related to the desired true ground force.

Referring to FIG. 2, the vehicle is indicated by the arrow 100 with the vibrator 10 located in the middle of the chassis (not numbered). The baseplate 20 is carried along by the vehicle 100 at its belly with the baseplate lifted off the ground for transport. When the baseplate 20 is over a shot point or source point for the survey the lift mechanism then lowers the vibrator 10 to the ground 55 so that the baseplate is in firm contact with it. The lift mechanism is conventional and includes a conventional pneumatic dampening system to insulate the vehicle 100 from the energy and vibrations of the vibrators when delivering a sweep into the ground 55.

With this setting in mind, we now turn to the iterative inversion process of this disclosure. During a normal setup for ZenSeis® typically there are three or four vibes that are sweeping concurrently and this number may vary dynamically. Each vibe is sweeping a phase encoded sweep that then must be separated during the inversion process. Imperfect separation at the higher frequencies has been observed and eventually was attributed to the poor GFE signal that is used in the inversion. See SEG: 2009-0011.

The basic premise of the HFVS or ZenSeis® or similar encoded inversions is that the GFE is the signature that the vibe puts out. This assumption has been shown to be flawed unless some independent method of measurement of the GFE is provided, such as from the load sensors 75. If one could create a derived GFE that was accurate, then the bandwidth of the inverted data would improve and be more accurate, and obviate the need for load sensors which has been shown in field trials.

The disclosure is based on the recognition that an iterative inversion of the setup data for a "derived" GFE that would minimize the cross talk between the vibes in the setup would be a more accurate way of maximizing the separation of the data. The GFE from the vibes would be the preliminary input to the inversion along with the setup field data and the optimization program would then minimize the cross-talk or leakage of the other vibes source signature onto the separated source records iteratively until some user defined limit is reached. The GFE's derived by the inversion approach would then be used to create the final seismic shot record data.

In other words, this disclosure addresses the problem of imperfect separation by minimizing the cross-talk between different sources, and does not require re-engineering the vibes to eliminate the problem in the first place. It can also be used retroactively to improve the separation of prior datasets where the actual data was recorded "raw" or in an uncorrelated or uninverted form.

Iterative inversion considers the fact that the seismic data is imperfect. Random noise, unwanted signals, missing data, and evanescent waves that cannot be back-propagated make a real deterministic inversion impossible. The goal of iterative inversion is to minimize the difference between the registered data vector Y and the synthetic data computed as the product of the propagator matrix A and the earth model X step by step in a Gaussian sense. To stabilize the computation, a small term $\epsilon^2 X^2$ has to be added:

$$(\underline{Y} - \underline{AX})^2 + \epsilon^2 \underline{X}^2 = \min$$

In the setup of vibratory sources and receivers, preferably the receivers are aligned in a straight receiving line, and at least one vibratory source is in line with the receiving line, whereas at least one vibratory source is offset from the receiving line, so as to cross-reference the signals emitted and recorded in an attempt to find out and eliminate any crosstalk between the vibratory sources or receivers or both.

Figure 4:
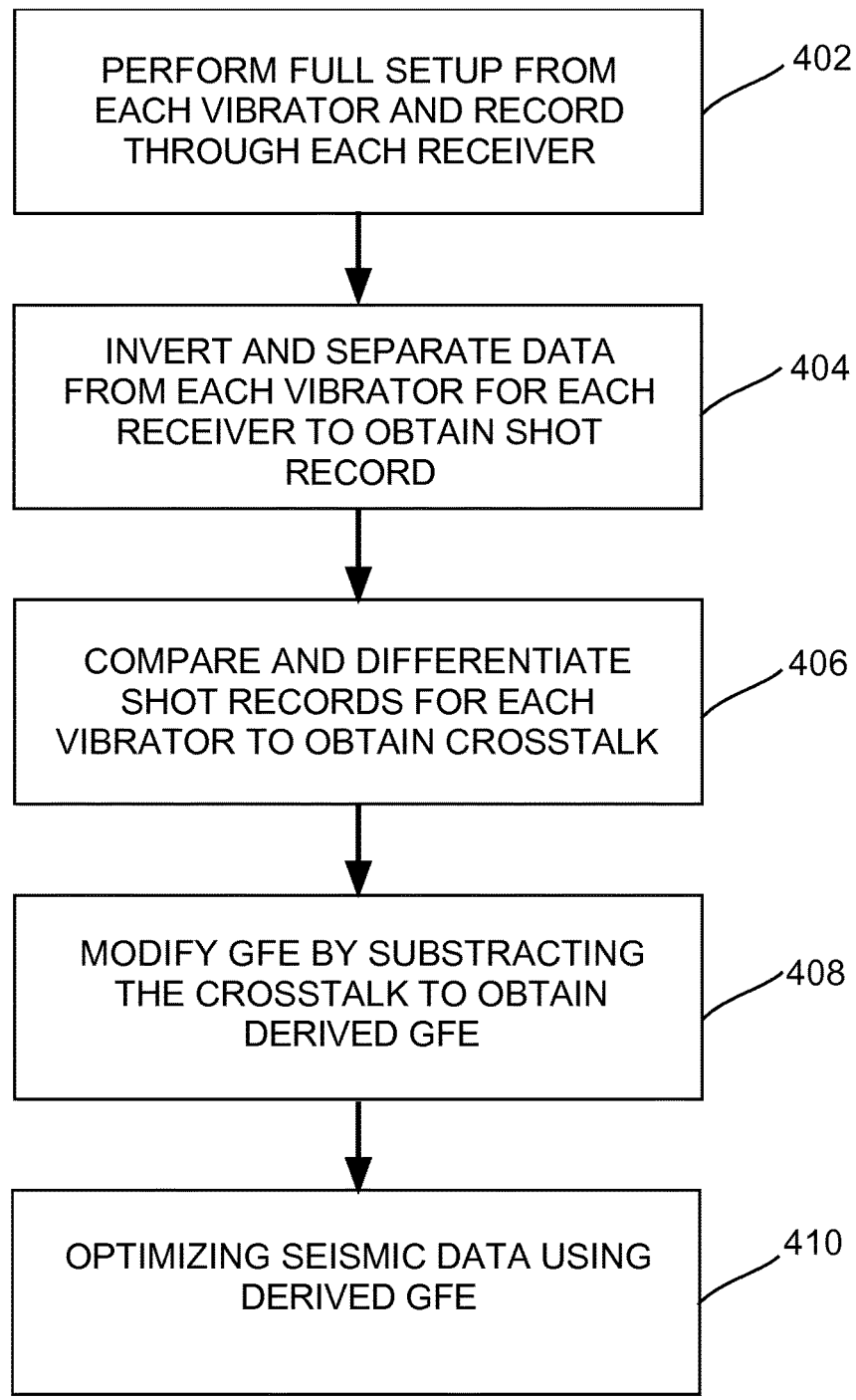
FIG. 4 is a flow chart of the method of this disclosure.

FIG. 4 shows the flow chart of the inventive method. In step 402, a full setup is performed from each vibrator and recorded through each receiver. In this exemplary setup there are multiple receivers and three vibrators. The receivers are spaced apart but aligned in line, while one vibrator is in line with the receivers, the other one perpendicularly offset from the receivers. Through this configuration for each vibrator there will be three different records, the differences between the records can therefore be compared and used to minimize crosstalk. Because Ground Force Estimate (GFE) is pivotal in seismic inversion, minimizing or eliminating crosstalk or other errors in GFE is therefore desirable.

In step 404, the full setup record obtained from the three receivers are inverted and separated by using known methodology and software algorithms, and shot records for each vibrator are obtained. The physical configuration of the vibrators and the receivers allows meaningful separation of the shot records.

In step 406, the separated shot records are compared and differenced for each vibrator, thereby obtaining the magnitude and shape of the crosstalk. This crosstalk can then be used to modify and optimize the GFE.

In step 408, the GFE is modified and optimized by subtracting the crosstalk obtained in step 406, and gives a "derived GFE" to be used in completing the seismic data.

In step 410, the seismic data is optimized using the derived GFE. Because the crosstalk has been significantly reduced in the derived GFE, the completed results are more accurate and reliable as compared to those inverted using normal GFE. As the seismic survey relocated to another location, the full setup will be carried out again to correct the crosstalk for each vibratory source.

The following references are incorporated by reference in their entirety.
1. J. J. Sallas, Seismic Vibrator Control and the Downgoing P-Wave, GEOPHYSICS 49(6) 732-40 (1984).
2. SEG-2009-001: Shaw S. A., et al., Vibroseis Source Signature Uncertainty And Its Impact On Simultaneous Sourcing (2009).
3. Shan S., et al., Load Cell System Test Experience: Measuring the Vibrator Ground Force on Land Seismic Acquisition, SEG Expanded Abstracts, 0016-0020 (October 2009).
1. U.S. Pat. No. 8,371,416
2. US20110013482

What is claimed is:

1. A method of separating seismic sources, comprising the steps of:
   a) providing at least two vibratory sources and two or more receivers, wherein said vibratory sources are each capable of generating a sweep of vibrations into the ground;
   b) performing a sweep of vibrations into the ground by said vibratory sources and concurrently recording a setup field data from each of said vibratory sources using each of said receivers, wherein an initial Ground Force Estimate (GFE) specific to each of said vibratory sources is obtained;
   c) performing iterative inversion for the setup field data from each of said vibratory sources using said initial GFE as preliminary input to obtain inverted setup field data;
   d) separating said inverted setup field data to obtain a shot record for each of said receivers from each of said vibratory sources, wherein for each said vibratory source the number of said shot records is the same as the number of said receivers;
   e) comparing and differentiating said shot records of the same vibratory source to yield a crosstalk modifier;
   f) modifying the initial GFE using said crosstalk modifier to obtain an improved derived GFE; and
   g) repeating steps b) to c) using said derived GFE instead of said initial GFE to minimize cross talk and obtain a final seismic data record and an optimized derived GFE.

2. The method of claim 1, wherein said initial GFE is obtained from a baseplate and reaction masses of said vibratory sources.

3. The method of claim 1, wherein said initial GFE is obtained using a Sallas approximation.

4. The method of claim 1, wherein in said step f) said crosstalk modifier is subtracted from said initial GFE to obtain said derived GFE.

5. The method of claim 1, wherein said sweep of vibration is between 0 to 400 Hz.

6. The method of claim 1, wherein said vibratory sources are selected from the group consisting of a ZENSEIS®, vibroseis, seismic vibrator, high fidelity vibratory seismic (HFVS), cascaded HFVS, combined HFVS, and combinations thereof.

7. The method of claim 1, wherein said receivers are selected from group consisting of a geophone, hydrophone, accelerometer, electrodynamic receiver, and combinations thereof.

8. The method of claim 1, wherein each said vibratory source emits a distinct seismic energy source signature.

9. The method of claim 1, wherein said receivers are aligned in a receiving line, and at least one of said vibratory sources is not in said receiving line.

10. An improved method for separating seismic field result where at least two vibratory sources and two or more receivers are provided and said vibratory sources are each capable of generating a sweep of vibrations into the ground, and a sweep of vibrations is emitted into the ground by said vibratory sources and concurrently a setup field data from each of said vibratory sources is recorded using each of said receivers, wherein an initial Ground Force Estimate (GFE) specific to each of said vibratory sources is obtained, the improvement comprising:
   a) performing iterative inversion for the setup field data from each of said vibratory sources using said initial GFE as preliminary input to obtain inverted setup field data;
   b) separating said inverted setup field data to obtain a shot record for each of said receivers from each of said vibratory sources, wherein for each said vibratory source the number of said shot records is the same as the number of said receivers;
   c) comparing and differentiating said shot records of the same vibratory source to yield a crosstalk modifier;
   d) modifying the initial GFE using said crosstalk modifier to obtain a derived GFE; and
   e) analyzing all remaining field data using said derived GFE in place of said initial GFE to obtain a final seismic record.

11. The improvement of claim 10, wherein said initial GFE is obtained from a baseplate and reaction masses of said vibratory sources.

12. The improvement of claim 10, wherein in said step d) said crosstalk modifier is subtracted from said initial GFE.

13. The improvement of claim 10, wherein said sweep of vibration is between 0 to 400 Hz.

14. The improvement of claim 10, wherein said vibratory sources are selected from the group consisting of a ZENSEIS®, vibroseis, seismic vibrator, high fidelity vibratory seismic (HFVS), cascaded HFVS, combined HFVS, and combinations thereof.

15. The improvement of claim 10, wherein said receivers are selected from group consisting of a geophone, hydrophone, accelerometer, electrodynamic receiver, and combinations thereof.

16. The improvement of claim 10, wherein each said vibratory source emit a distinct seismic energy source signature.

17. The improvement of claim 10, wherein said receivers are aligned in a receiving line, and at least one of said vibratory sources is not in said receiving line.

18. An improved method for separating seismic field results where at least two vibratory sources and two or more receivers are provided and said vibratory sources are each capable of generating a sweep of vibrations into the ground, and a sweep of vibrations is emitted into the ground by said vibratory sources and concurrently a setup field data from each of said vibratory sources is recorded using each of said receivers, wherein an initial Ground Force Estimate (GFE) specific to each of said vibratory sources is obtained, the improvement comprising comparing and differencing shot records of the same vibratory source to yield a crosstalk modifier; modifying said initial GFE using said crosstalk modifier to obtain a derived GFE; and analyzing all remaining field data using said derived GFE in place of said initial GFE to obtain a final seismic record.

* * * * *